United States Patent Office 3,428,428
Patented Feb. 18, 1969

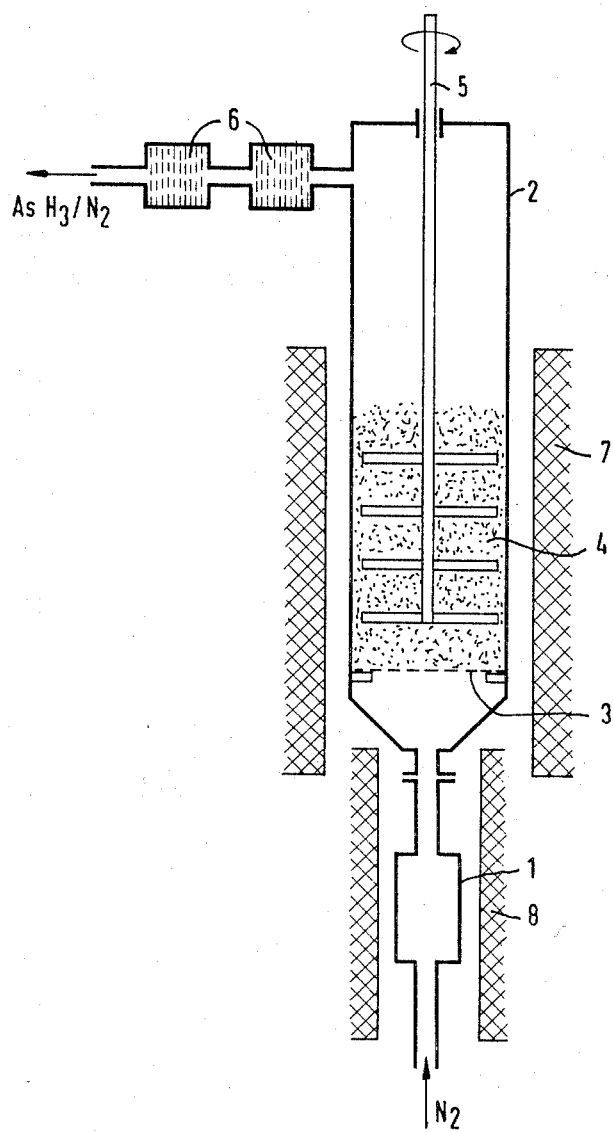

3,428,428
PRODUCTION OF HYDRIDES OF ELEMENTS OF
GROUP V OF THE PERIODIC SYSTEM
Walter Miederer, Hanau am Main, and Hilmar Kuttner,
Nuremberg, Germany, assignors to Siemens Aktiengesellschaft, a corporation of Germany
Filed May 27, 1965, Ser. No. 459,182
Claims priority, application Germany, May 27, 1964,
S 91,250
U.S. Cl. 23—204    7 Claims
Int. Cl. C01b 6/00

ABSTRACT OF THE DISCLOSURE

Described is a method of preparing hydrides of group V elements of the periodic system. These elements are arsenic, phosphorus and antimony. The method comprises reacting a halide of the group V element with a solid lithium hydride powder at a temperature from 100 to 250° C. Inert carriers may be used and the reaction is preferably carried out in a fluidized bed.

Various methods are known for the production of hydrides of elements of the Vth main group, which as used herein is intended to mean As, P and Sb. $AsH_3$, for example, is prepared by dissociation of arsenides with acids, by electrolytic reduction of arsenite solutions or by reaction of $LiAlH_4$ and $AsCl_3$ in ethereal solution. A method is known whereby halides of elements of the III and IV groups are hydrogenized, which is also applied to elements of the V group, by means of introducing chlorides into molten LiCl/KCl/LiH at 400° C.

The previously known methods are complicated and not satisfactory for the production of hydrides of elements of the V group of the periodic system as defined above, which elements are needed for reaction, for example, in the production of $A^{III}B^V$ compounds. The hydrides prepared by the known method do not supply a constant gas current and are contaminated with solvent vapors. Furthermore, the reaction temperatures are so high that the hydrides strongly dissociate while still in the reactor.

According to our invention, these disadvantages are eliminated since the appropriate gaseous halides are reacted with powdered lithium hydride, at temperatures from 100 to 250° C. An inert carrier gas, e.g. nitrogen or argon, may be added to the halides and an inert solid substance, e.g. quartz powder, sand, NaCl or KCl may be admixed with the lithium powder. The reaction partners are well mixed together by turbulently swirling the lithium hydride powder or lithium hydride powder mixed with inert solid substances. This turbulent mixing can be effected by the gas current, which contains the halide, flowing through the powder or by a rotating agitator.

The hydrides produced according to our invention are of high purity. The reaction temperature of the method is relatively low, so that neither a decomposition (dissociation) of the synthesized hydrides nor contamination of the product by the vessel material occurs. Since no solvents are employed, contamination through solvents as impossible.

The drawing shows a suitable device for performing the method of the invention.

An inert carrier gas which entrains a volatile halide in the vaporizer 1 flows from below into the cylinder-shaped reaction chamber 2 and swirls the lithium hydride-solid substance mixture 4, supported by the perforated bottom plate 3. The cylindrical reaction chamber has an inside diameter of 5 cm., a height of 40 cm., and is constructed of glass, quartz or steel. The flow rate of the gas, of course, should not be so great as to blow the lithium hydride bed out of the reactor. The swirling of the mixture may also be achieved by rotator 5. The gaseous reaction product escaping at the upper end of the reaction chamber is freed from any accompanying powder in the dust collecting chambers 6, which are coupled on the outlet side. Furnaces 7 and 8 heat the reaction chamber to 100 to 250° C. and the vaporizer to vaporizing temperature, e.g. 130° C.

The following examples are for the purpose of illustrating the invention without limiting the same.

EXAMPLE 1

200 g. quartz powder and 10 g. LiH are violently swirled in the reaction chamber, by a rotator (1000 r.p.m.). A nitrogen current of 20 l./hr. is introduced via $AsCl_3$ evaporator which is kept at 110° C. and contains 10 g. $AsCl_3$, wherein the gas current entrains $AsCl_3$, into the reactor from below. The LiH/quartz powder mixture is kept at approximately 200° C. The exhaust gas, freed from powder dust by quartz wool in chambers 6, consisting of $AsH_3$ and $N_2$, is then dissociated in a dissociation tube (not shown) with deposition of As. After 2 hours, the $AsCl_3$ supply in the evaporator was exhausted and vaporized and 3.1 g. As was deposited in the dissociation tube. This corresponds to about 70% of theoretical.

EXAMPLE 2

A nitrogen current (at 20 l./hr.) entrains $PCl_3$ in a vaporizer, kept at 60° C. and containing 7.9 g. $PCl_3$. The resulting gas mixture is introduced into the reactor from below. The reactor is loaded with 10 g. LiH and 200 g. ground quartz powder and is kept at 200° C. After two hours, the given $PCl_3$ is vaporized and the dissociation tube contains 1.2 g. P or 70% of theoretical.

EXAMPLE 3

A nitrogen current (20 l./hr.) entrains $AsBr_3$ in a vaporizer containing 17.5 g. $AsBr_3$ and kept at 195° C. The gas mixture is then fed to the reactor from below. The reactor is loaded with 10 g. LiH and 150 g. KCl and is kept at 195° C. After two hours, the given $AsBr_3$ is vaporized and 2.8 g. As is found in the dissociation tube to give about 65% of theoretical.

EXAMPLE 4

A nitrogen current (20 l./hr.) entrains $AsF_3$ in a vaporizer containing 13 g. $AsF_3$ and maintained at 36° C. The gas mixture is then supplied from below to the reactor, which is filled with 10 g. LiH and 60 g. NaCl and maintained at 190° C. After 1.5 hours, the $AsF_3$ is vaporized and 4.5 g. As are deposited in the dissociation tube. This amounts to about 60% of theoretical.

EXAMPLE 5

A nitrogen current (20 l./hr.) entrains $PBr_3$ in a vaporizer containing 27 g. $PBr_3$ and maintained at 155° C. The gas mixture is then fed from below to the reactor, which is supplied with 10 g. LiH and 50 g. quartz meal and maintained at 200° C. After 2 hours, the $PBr_3$ in the evaporator is vaporized and about 2.15 g. P are deposited in the dissociation tube, which corresponds to about 70% of theoretical.

EXAMPLE 6

A nitrogen current (about 20 l./hr.) entrains $SbBr_3$ in an evaporator containing 36 g. $SbBr_3$ and maintained at 210° C. The gas mixture is then introduced, from below, into the reactor, which contains 10 g. LiH and 30 g. finely ground quartz meal and is kept at 230° C. After 3 hours, the $SbBr_3$ supplied is vaporized and about 6 g. Sb are deposited in the dissociation tube; this is about 50% of theoretical.

EXAMPLE 7

An $N_2$ current (about 20 l./hr.) entrains $SbCl_3$ in a vaporizer containing 23 g. $SbCl_3$ and maintained at 200° C. The gas mixture is supplied from below to the reactor, which is maintained at 230° C. and contains 10 g. LiH and 50 g. KCl. After 2.5 hours the $SbCl_3$ supplied is vaporized and 7.7 g. Sb are deposited in the dissociation tube; this is about 65% of theoretical.

EXAMPLE 8

An $N_2$ current (about 40 l./hr.) entrains $SbI_3$ in a vaporizer containing 25 g. $SbI_3$ and kept at 250° C. The gas mixture is then supplied, from below, to the reactor, which contains 15 g. LiH and 50 g. quartz meal and is kept at 250° C. After 10 hours, about 1.2 g. Sb are deposited in the dissociation tube. Due to the low vapor pressure of $SbI_3$, at 250° C., only about half of the supplied $SbI_3$ had vaporized after a testing period of 10 hours.

Argon or other inert gases can be used in lieu of nitrogen in the above examples to achieve the same results.

We claim:
1. The method of preparing hydrides of a group V element of the periodic system, which comprises reacting a halide of the group V element with solid lithium hydride powder at a temperature from 100 to 250° C.
2. The method of preparing hydrides of a group V element of the periodic system, which comprises reacting a halide of the group V element admixed with an inert carrier gas with solid lithium hydride powder at a temperature from 100 to 250° C.
3. The method of preparing hydrides of a group V element of the periodic system, which comprises reacting a halide of the group V element admixed with an inert carrier gas with solid lithium hydride powder admixed with an inert solid at a temperature from 100 to 250° C.
4. The method of preparing hydrides of a group V element of the periodic table, which comprises reacting in a fluidized bed to create turbulent conditions a halide of the group V element admixed with an inert gas with solid lithium hydride powder at a temperature from 100 to 250° C.
5. The method of preparing hydrides of arsenic, which comprises reacting under turbulent conditions a halide of arsenic admixed with nitrogen with solid lithium hydride powder at a temperature from 100 to 250° C.
6. The method of preparing hydrides of phosphorus, which comprises reacting under turbulent conditions a halide of phosphorus admixed with nitrogen with solid lithium hydride powder at a temperature from 100 to 250° C.
7. The method of preparing hydrides of antimony, which comprises reacting under turbulent conditions a halide of antimony admixed with nitrogen with solid lithium hydride powder at a temperature from 100 to 250° C.

References Cited

UNITED STATES PATENTS

| | | | |
|---|---|---|---|
| 2,474,021 | 6/1949 | Vinning | 23—1 |
| 3,163,590 | 4/1961 | Litz et al. | 23—204 |
| 3,188,173 | 6/1965 | Hughes et al. | 23—182 |
| 3,382,048 | 5/1968 | Lindberg | 23—204 X |

OTHER REFERENCES

Thomas Gibb, Jr.: "Journal of The Electrochemical Society," vol. 93, No. 5, May 1948, pp. 206–207.

OSCAR R. VERTIZ, *Primary Examiner.*

G. O. PETERS, *Assistant Examiner.*